June 13, 1961   W. B. HAMPTON ET AL   2,988,021
DOUGH PIECE RETARDER
Filed Feb. 20, 1958

INVENTORS
William B. Hampton
Paul M. Thomason
BY
Bailey, Stephens & Huettig
ATTORNEYS

United States Patent Office 2,988,021
Patented June 13, 1961

2,988,021
DOUGH PIECE RETARDER
William B. Hampton and Paul M. Thomason, Oklahoma City, Okla., assignors to C. J. Patterson Company, Kansas City, Mo., a corporation of Missouri
Filed Feb. 20, 1958, Ser. No. 716,355
2 Claims. (Cl. 107—9)

This invention relates to the handling of dough pieces in a bakery. In particular, the invention is directed to the separation of dough pieces by temporary retarding of the movement of pieces of dough.

In bakeries such as large commercial bakeries, the dough is handled mechanically through substantially all of the operations involved in making a loaf of bread. In one step, the mass of dough goes through a divider in which the dough mass is separated into pieces having the weight of the loaf to be formed from each piece. The dough then passes from the delivery end of the divider belt to a shaper and then to the molder from which the dough is panned for the oven. The dough divider in commercial operations deposits simultaneously a plurality of dough pieces upon a moving belt from which they are passed to succeeding belts for shaping and transferred to the mold. If the dough pieces are deposited close together, and particularly if a wet dough is being used, the pieces on the belt tend to spread and stick together. They then must be separated for transfer to the shaper.

The object of this invention is to provide a means for separating the dough pieces as they are transferred from the divider belt to the shaping belts.

The means by which the object of the invention is obtained are disclosed more fully with reference to the accompanying drawings, in which.

Figure 1:
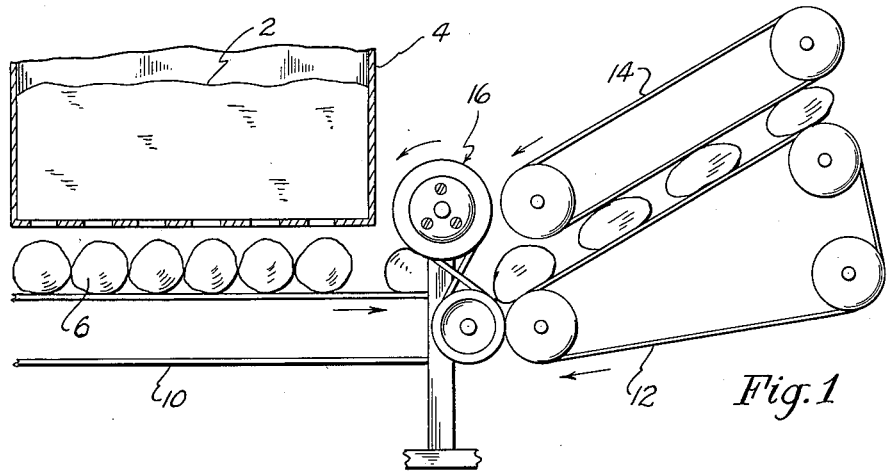
FIGURE 1 is a diagrammatic side view of the apparatus for dividing dough into pieces and transferring them to a shaper.
Figure 2:
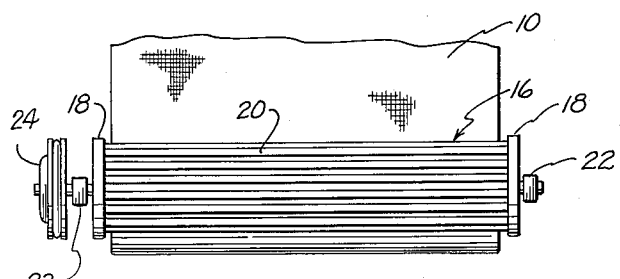
FIGURE 2 is a plan view of the dough retarding device.
Figure 3:
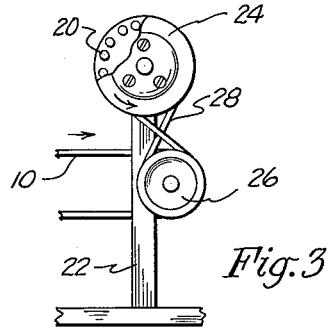
FIGURE 3 is a side elevational view of the retarding device.
Figure 4:
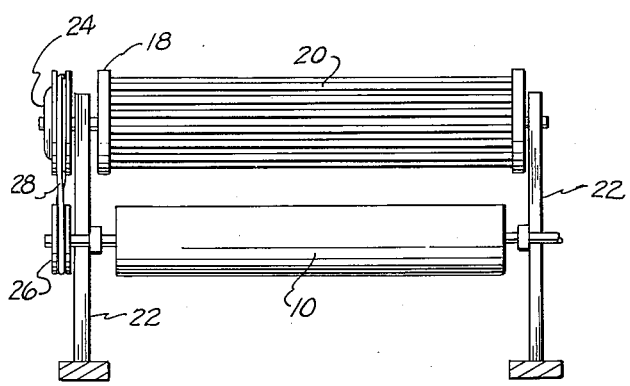
FIGURE 4 is a front elevational view of the retarding device.

As outlined in FIGURE 1, a fermented dough 2 is first placed in a dough divider 4. This divider extrudes lumps or pieces of dough 6 upon an endless conveyor belt 10. The conveyor belt transfers the dough to a shaper conveyor composed of a lower belt 12 and an upper belt 14. Belt 12 travels faster than belt 10 and belt 14 travels faster than belt 12. Thus as each dough piece is discharged from belt 10 onto belt 12 it is caught between belts 10 and 12 and moved at a faster speed between belts 12 and 14 so that the dough pieces are spaced farther apart and are rounded and shaped on their way to a molder. At the same time, they are dusted with flour. In the example shown, six dough pieces 6 are extruded from divider 4 at the same time. These dough pieces are so close together that they tend to spread out and stick to each other, especially when a wet dough is being used. Consequently, two or more stuck together pieces are likely to be snatched off belt 10 and between belts 12 and 14 so that the required separation of the pieces is not accomplished.

This difficulty is overcome by the use of a squirrel cage dough retarding device 16. This device is a squirrel cage composed of end plates 18 between which extend a plurality of parallel rods 20 forming the circumference of the squirrel cage. The cage is journaled in a frame 22 which can be a part of the framework for supporting the divider. To one end of the squirrel cage is attached a sheave 24 which is connected to a sheave 26 joined to the axle of the end pulley for belt 10. Sheaves 24 and 26 are connected by a belt 28 so that cage 16 rotates in the same direction as the travel of the upper reach of belt 10. It is important, however, that the peripheral speed of cage 16 be the same as the linear speed of belt 10.

In operation, the belts have the following relative speeds. Divider belt 10 runs from about 10 to 12 linear feet per minute. Belt 12 runs from about 100 to 176 feet per minute, and belt 14 has a speed of from about 275 to 500 feet per minute. The dough pieces on belt 10 pass beneath cage 16, which cage presses firmly upon, but without such pressure as would rupture the skin of, the dough piece. As the leading dough piece leaves cage 16, it is snatched away at a higher speed by belt 12. Meanwhile the next dough piece is retarded from moving any faster by the pressure of cage 16. Therefore, if the dough pieces are stuck together at their edges, they will be torn apart before they can both reach belt 12.

This retarding device is extremely effective. Its construction is very simple and its operation requires an insignificant amount of power taken from the drive for belt 10.

Having now described the means by which the object of the invention is obtained, we claim:

1. In combination with a low speed dough divider belt conveying a row of sticky surfaced undusted dough pieces in substantial contact with each other and a pair of high speed transfer and shaper belts immediately adjacent the delivery end of said divider belt for receiving separate dough pieces coming from said divider belt, a dough piece retarder comprising a cylindrical squirrel cage rotatably mounted transversely above the delivery end of said divider belt, and means for rotating said squirrel cage at the approximate speed of said divider belt and at a lower speed than said transfer and shaper belts to hold back and separate a piece of dough from a preceding piece of dough seized by and being advanced by said transfer and shaper belts.

2. In the combination of claim 1, said rotating means comprising a belt connection to said divider belt.

References Cited in the file of this patent

UNITED STATES PATENTS

| | | |
|---|---|---|
| 1,253,444 | Van Hooten | Jan. 15, 1918 |
| 1,270,096 | Baker | June 18, 1918 |
| 2,021,251 | Brykczynski et al. | Nov. 19, 1935 |
| 2,093,466 | Marasso | Sept. 21, 1937 |
| 2,450,033 | Cohen | Sept. 28, 1948 |
| 2,643,619 | Bonebrake | June 30, 1953 |
| 2,657,648 | Sawyer et al. | Nov. 3, 1953 |

FOREIGN PATENTS

| | | |
|---|---|---|
| 180,058 | Great Britain | May 18, 1922 |